United States Patent
Ben-Israel (10) Patent No.: US 12,447,302 B2
(45) Date of Patent: Oct. 21, 2025

(54) NEBULIZER ORIENTATION APPARATUS

(71) Applicant: Frank Fish, Benoni (ZA)

(72) Inventor: Karin-Ann Ben-Israel, Johannesburg (ZA)

(*) Notice: Subject to any disclaimer, the term of this patent is extended or adjusted under 35 U.S.C. 154(b) by 1074 days.

(21) Appl. No.: 16/649,012

(22) PCT Filed: Sep. 5, 2018

(86) PCT No.: PCT/IB2018/056768
§ 371 (c)(1),
(2) Date: Mar. 19, 2020

(87) PCT Pub. No.: WO2019/058199
PCT Pub. Date: Mar. 28, 2019

(65) Prior Publication Data
US 2020/0289779 A1    Sep. 17, 2020

(30) Foreign Application Priority Data
Sep. 19, 2017  (ZA) .................................. 2017/04891

(51) Int. Cl.
*A61M 16/08* (2006.01)
*A61M 11/02* (2006.01)
*A61M 11/06* (2006.01)

(52) U.S. Cl.
CPC ........ *A61M 16/0825* (2014.02); *A61M 11/02* (2013.01); *A61M 11/06* (2013.01); *A61M 16/0875* (2013.01)

(58) Field of Classification Search
CPC .......... A61M 16/0875; A61M 16/0816; A61M 16/06; A61M 11/02
See application file for complete search history.

(56) References Cited

U.S. PATENT DOCUMENTS 5,357,945 A    10/1994  Messina
7,726,309 B2 *  6/2010  Ho ..................... A61M 16/0633
                                                128/912

(Continued)

FOREIGN PATENT DOCUMENTS

CN      205612830 U    10/2016
ES       1045126 U     6/2000
WO   WO-2016085354 A1 * 6/2016  ........... A61B 5/0813

OTHER PUBLICATIONS

English translation of ES1045126U.

(Continued)

*Primary Examiner* — Kendra D Carter
*Assistant Examiner* — Maap Ellabib
(74) *Attorney, Agent, or Firm* — LADAS & PARRY LLP (57) ABSTRACT

There is provided a nebulizer orientation apparatus for orientating an aerosol or mist forming means of the nebulizer into a substantially vertical position relative to the ground level under force of gravity. Particularly, there is provided a nebulizer orientation apparatus comprising first and second straight hollow bodies in flow communication with each other via a joint means, which joint means facilitating movement of the first and second straight hollow bodies relative to each other in a first plane facilitated by the joint means, and wherein the first straight hollow body is weighted relative to the second straight hollow body to facilitate displacement of the first body under force of gravity relative to the second body.

14 Claims, 7 Drawing Sheets

(56) References Cited

U.S. PATENT DOCUMENTS

| | | | | |
|---|---|---|---|---|
| 2005/0092325 A1* | 5/2005 | Dionne | ............ | A61M 16/0825 |
| 2007/0049841 A1* | 3/2007 | Lepel | .................... | A61M 16/06 |
| | | | | 600/534 |
| 2010/0224276 A1* | 9/2010 | Forrester | ................ | F16L 11/112 |
| | | | | 138/122 |
| 2012/0285452 A1 | 11/2012 | Amirav et al. | | |
| 2014/0000626 A1* | 1/2014 | O'Connor | ......... | A61M 16/0875 |
| | | | | 128/207.18 |
| 2014/0166010 A1* | 6/2014 | Varga | ................ | A61M 16/0825 |
| | | | | 128/203.29 |
| 2016/0022942 A1* | 1/2016 | Millar | ............... | A61M 16/0463 |
| | | | | 128/202.13 |
| 2016/0158477 A1* | 6/2016 | Dhuper | ................ | A61M 16/14 |
| | | | | 128/200.23 |
| 2016/0372803 A1* | 12/2016 | Miller | ............... | H01M 10/6554 |
| 2017/0007797 A1* | 1/2017 | Islava | ............... | A61M 16/0825 |

OTHER PUBLICATIONS

English translation of CN205612830U.
Extended European Search Report issued in foreign counterpart application.

* cited by examiner

NEBULIZER ORIENTATION APPARATUS

RELATED APPLICATION

This application is a national stage entry under 35 USC 371 of International Application No. PCT/IB2018/056768 filed on 5 Sep. 2018, the entire contents of which are incorporated herein by reference.

FIELD OF INVENTION

This invention relates to a nebulization means for use in the medical industry. Particularly, this invention relates to a nebulizer orientation apparatus. In a certain embodiment the nebulizer orientation apparatus may be for interposition between a nebulizer and an inhalation mask or mouthpiece.

BACKGROUND

Nebulizers are well known drug delivery means utilized in the medical industry in order to provide a drug entrained aerosol or mist from a drug containing solution or suspension, which drug entrained aerosol or mist being for inhalation by a patient in need thereof. The mist may for example include the drug in an aerosolized or an atomized form.

A typical nebulizer includes a reservoir for housing a drug entrained solution, a gas inlet into the reservoir to allow a gas (such as medical oxygen) to pass over or through the solution, an aerosol or mist forming means, typically a nozzle having a first orifice to receive drug entrained solution and gas and an opposite spray orifice from which the aerosol or mist is dispensed, and an outlet for receiving the aerosol or mist, which outlet extending away from the nozzle and reservoir and generally in flow communication with an inhalation mask or mouthpiece.

When in use, pressurized gas enters the nebulizer via the gas inlet, passing over or through the drug entrained solution before passing through the nozzle to produce a Venturi effect that facilitates drawing the drug entrained solution up and into the nozzle by means of a pressure differential such that said drug entrained solution is encouraged to form an aerosol or mist as it passes through the nozzle and/or when expelled through the spray orifice, through the outlet, and to the patient via the inhalation mask or mouthpiece. The nozzle typically provides a narrow passage and may taper towards its spray orifice.

A mechanically rudimentary nebulizer relying on only a tapering nozzle to facilitate aerosol or mist formation is known to be ineffective often resulting in non-aerosolized drug entrained droplets being administered to the patient. This situation is inimical since droplet size is important in administration regimes of certain drugs. Consequently, standard nebulizers have been adapted to provide a baffle arrangement (often shaped and/or dimensioned as an anvil arrangement) substantially adjacent the nozzle and spaced from the orifice to further and more effectively facilitate aerosol or mist formation and to hinder non-aerosolized droplets from being inhaled when in use.

In order to ensure proper functioning of the nebulizer when in use, the nozzle is required to remain vertical relative to the ground. This requires patients to be seated in a generally upright position, or to be standing, when inhaling drugs via a nebulizer creating for operational difficulties. Often patients are too weak to sit in the required position, are unconscious, are recovering from a general anaesthetic, or are under general anesthesia hindering placement of the patient in an appropriate position relative to the nozzle.

It is also common for the outlet to join the inhalation mask or mouthpiece via an elbowed joint, typically providing a bend of about 90°. The elbowed joint encourages the patient to sit in an upright position prior to using the nebulizer, however, it frustrates drug administration in situations where the patient cannot comply. Further, the elbowed joint provides a curved flow path and a surface upon which the aerosol or mist can condense providing non-aerosolized drug entrained droplets which may negatively impact on the efficacy of the drug delivery. It is also known that a longer length between the outlet and the inhalation mask or mouthpiece increases the risk of condensation.

There is a need to ameliorate at least one of the problems described above and/or known in the prior art.

SUMMARY

Broadly, and in accordance with this general disclosure there is provided a nebulizer orientation apparatus for orientating an aerosol or mist forming means of the nebulizer into a substantially vertical position relative to the ground level under force of gravity.

In accordance with a first embodiment of this disclosure there is provided a nebulizer orientation apparatus for interposition between a nebulizer and an inhalation mask (or mouthpiece), the nebulizer orientation apparatus comprising:

- first and second straight hollow bodies in flow communication with each other via a joint means, which joint means facilitating movement of the first and second straight hollow bodies relative to each other in a first plane defined (or facilitated) by the joint means, and
- wherein the first straight hollow body is weighted relative to the second straight hollow body to facilitate displacement of the first body under force of gravity relative to the second body, such that in use, the nebulizer may be attached to the first body and the inhalation mask (or mouthpiece) may be attached to the second body, the nebulizer containing a drug entrained solution and the inhalation mask (or mouth piece) placed over a mouth and/or nose of a patient, and

- wherein the first body together with the nebulizer may be displaced relative to the second body under force of gravity to ensure that the nebulizer, and particularly an aerosol or mist forming means of the nebulizer, is maintained substantially upright relative to ground level therein facilitating effective aerosol and/or mist formation when a torso and/or head of the patient is moved away from a substantially vertical position relative to the ground level.

The nebulizer orientation apparatus may further comprise a hollow connector rotationally mounted relative to an outlet portion of the second hollow body, wherein rotational movement of the hollow connector relative to the second hollow body is in a second plane. The second plane being substantially orthogonal to the first plane.

The joint means may comprise a deformable conduit.

The deformable conduit may comprise a metallic support embedded in a plastics material. The metallic support may be any one of a coil, helix, and/or lattice. The deformable conduit may be resilient. The deformable conduit may be expandable and/or contractable along its length. The deformable conduit may be provided with corrugations along its length to facilitate expansion. The deformable conduit may have a smooth interior bore.

The deformable conduit may include a mid-portion having a larger diameter relative to opposing end portions.

The hollow connector may be rotationally mounted relative to the outlet portion of the second hollow body via an attachment means, wherein the attachment means facilitating rotational movement of the hollow connector relative to the second hollow body in the second plane substantially orthogonal to the first plane.

The attachment means may be a sleeve securing the outlet portion of the second hollow body to the hollow connector whilst concomitantly providing rotational motion relative to each other.

The hollow connector may matingly engage the outlet of the second hollow body whilst being adapted to concomitantly provide for rotational motion of the second hollow body relative to the hollow connector.

The first and second straight hollow bodies may each matingly engage the joint means. Alternatively, or additionally, the first and second straight hollow bodies may be integrally formed with the joint means.

The first and second straight hollow bodies may be formed from a plastics material.

The first hollow body may be weighted by being formed from a heavier material relative to the second hollow body, therein facilitating displacement of the first hollow body under force of gravity relative to the second hollow body.

The first and second hollow bodies may be manufactured from substantially the same material, and the first hollow body may weighted by being greater in length relative to the second hollow body, so as to provide the first hollow body with a greater mass relative to the second hollow body, therein facilitating displacement of the first hollow body under force of gravity relative to the second hollow body.

The first hollow body may be weighted by having attached thereto a weight means.

The weight means may be a collar and/or a ring at least partially surrounding the first hollow body. The weight means may be integrally formed with the first hollow body.

In a particular example of the first embodiment of this disclosure the weight means may be a thickening of a portion of a sidewall providing the first hollow body.

The weight means may be manufactured from a metallic material.

In accordance with a second embodiment of this disclosure there is provided a nebulizer orientation apparatus for interposition between a nebulizer and an inhalation mask (or mouthpiece), the nebulizer orientation apparatus comprising:

first and second straight hollow bodies in flow communication with each other via a hinged joint, wherein the first straight hollow body is weighted relative to the second straight hollow body to facilitate displacement of the first body under force of gravity relative to the second body; and a hollow connector rotationally secured against an outlet of the second hollow body in flow communication with the inhalation mask (or mouthpiece), the hollow connector allowing rotational movement via an attachment means relative to the second hollow body, hinge and first hollow body, such that in use, the weight of the first hollow body facilitates displacement of the first hollow body under force of gravity relative to the second hollow body, said displacement being in a first plane defined (or facilitated) by the hinged joint, and wherein the attachment means facilitating rotational movement of the hollow connector relative to the second hollow body in a second plane. The second plane being substantially orthogonal to the first plane.

The attachment means may be a sleeve securing an outlet portion of the second hollow body to the hollow connector whilst concomitantly providing rotational motion relative to each other.

The hinged joint may include a first pair of lugs attached to the first hollow body, and a second corresponding pair of lugs attached to the second hollow body, wherein the first and second pair of lugs are secured via nuts and bolts, alternatively, secured by way of interlocking studs and corresponding apertures.

The hinged joint may further include thereabout, and spanning the first and second hollow bodies, a closure in order to provide a closed flow path from the first hollow body, through the hinged joint, through the second hollow body, into and through the hollow connector and into the inhalation means (or mouthpiece) to be inhaled by the patient.

The closure may be a resiliently deformable closure to allow hinged movement of the first and second hollow bodies relative to each other through a section of the first plane.

The first and second straight hollow bodies may be formed from a plastics material.

The first hollow body may be weighted by being formed from a heavier material relative to the second hollow body, therein facilitating displacement of the first hollow body under force of gravity relative to the second hollow body.

The first and second hollow bodies may be manufactured from substantially the same material, and the first hollow body may weighted by being greater in length relative to the second hollow body, so as to provide the first hollow body with a greater mass relative to the second hollow body, therein facilitating displacement of the first hollow body under force of gravity relative to the second hollow body.

The first hollow body may be weighted by having attached thereto a weight means.

The weight means may be a collar and/or a ring at least partially surrounding the first hollow body. The weight means may be integrally formed with the first hollow body.

In a particular example of the first embodiment of this disclosure the weight means may be a thickening of a portion of a sidewall providing the first hollow body.

The weight means may be manufactured from a metallic material.

In accordance with a third embodiment of this disclosure there is provided a nebulizer orientation apparatus for interposition between a nebulizer and an inhalation mask (or mouthpiece), the nebulizer orientation apparatus comprising:

a swivel joint having extending from opposite ends thereof first and second straight hollow bodies, respectively, wherein the first straight hollow body is weighted relative to the second straight hollow body, such that in use, the weight of the first straight hollow body facilitates displacement of the first straight hollow body under force of gravity relative to the second straight hollow body.

The swivel joint may comprise a ball and socket arrangement, wherein the socket defines therethrough an aperture and is provided as a female frusto-spherical member, and wherein the ball may be provided as a complementarily shaped and dimensioned male frusto-spherical member defining therein a cavity such that the male and female members matingly engage to provide a flow path from the first hollow body through the swivel joint and out through the second hollow body.

The swivel joint may facilitate swiveled displacement and/or pivotal displacement of the first and second hollow bodies thereabout.

In a particular example of the first embodiment of this disclosure the female frusto-spherical member of the swivel joint is attached to the first hollow body, and the complementarily shaped and dimensioned male frusto-spherical member of the swivel joint is attached to the second hollow body. It is to be understood that the female frusto-spherical member of the swivel joint may be attached to the second hollow body, and the complementarily shaped and dimensioned male frusto-spherical member of the swivel joint may be attached to the first hollow body without departing from the scope of this disclosure.

The female frusto-spherical member and/or the complimentarily shaped and dimensioned male frusto-spherical member may be formed from a resilient material to facilitate mating engagement.

The first and second straight hollow bodies may be formed from a plastics material.

The first hollow body may be weighted by being formed from a heavier material relative to the second hollow body, therein facilitating displacement of the first hollow body under force of gravity relative to the second hollow body.

The first and second hollow bodies may be manufactured from substantially the same material, and the first hollow body may weighted by being greater in length relative to the second hollow body, so as to provide the first hollow body with a greater mass relative to the second hollow body, therein facilitating displacement of the first hollow body under force of gravity relative to the second hollow body.

The first hollow body may be weighted by having attached thereto a weight means.

The weight means may be a collar and/or a ring at least partially surrounding the first hollow body. The weight means may be integrally formed with the first hollow body.

In a particular example of the first embodiment of this disclosure the weight means may be a thickening of a portion of a sidewall providing the first hollow body.

The weight means may be manufactured from a metallic material.

The swivel joint may include a securing means to ensure that the male frusto-spherical member remains matingly engaged inside the female frusto-spherical member whilst still facilitating swiveled displacement and/or pivotal displacement relative to each other.

The securing means may include a first flange extending radially outwardly away from a periphery which defines an open mouth of the female frusto-spherical member, and a second corresponding flange for securement to the first flange, the second corresponding flange having depending downwardly away therefrom a frusto-spherical side wall, the second flange being locatable over the second body to secure against the first flange, wherein the frusto-spherical sidewall prevents disengagement of the frusto-spherical male member from the female frusto-spherical member.

The first and second flange may be joined in securing abutment through various adhesive means, for example, glue. In a certain embodiment, the first and second flanges may be spaced by a rubber ring.

There is provided for the swivel joint to provide a seal in order to ensure all aerosol or mist travels through the flow path toward the inhalation mask (or mouthpiece). In certain embodiments the swivel joint does not to provide a seal in order to substantially equalize pressure relative to atmospheric pressure. For example, the swivel joint may be provided with a hole through a wall thereof to ensure equalization of pressure to atmospheric pressure.

It is to be understood that the shape and dimension of the swivel joint may extend to include, but not limitingly so, discoid, geoid, oblong and elliptical type shapes and dimensions.

In accordance with a fourth embodiment of this disclosure there is provided a method of nebulizing a patient utilizing the nebulizer orientation apparatus described any one of the first, second or third embodiments of the disclosure herein, the method comprising the following steps:
  connecting a nebulizer containing drug entrained solution therein to the first hollow body;
  connecting the inhalation mask (or mouthpiece) to the second hollow body, preferably via a tube;
  placing the inhalation mask (or mouthpiece) about an oral and/or nasal cavity of the patient;
  actuating the nebulizer, in so doing,
allowing the drug entrained solution to aerosolize and/or atomize into a drug entrained aerosol or mist through an aerosol or mist forming means, the drug entrained aerosol or mist flowing through the joint means into and through the second hollow body, through the inhalation means (or mouthpiece) and into the oral and/or nasal cavity of the patient.

The aerosol or mist forming means may be a nozzle. Preferably, the nozzle may taper from a first orifice which in use receives drug entrained solution and gas to an opposite spray orifice from which the aerosol or mist is dispensed.

The weighted first hollow body facilitates maintenance of the nozzle in a substantially vertical position relative to the ground so as to ensure proper aerosol and/or mist formation.

The straight first and second hollow bodies provide a near straight flow path hindering condensation, and facilitating appropriate droplet size and/or appropriate drug dosage regimes.

There is further provided for a nebulizer orientation apparatus according to a first and/or second and/or third embodiment of this disclosure, and/or a method of nebulizing a patient according to a fourth embodiment of this disclosure, each embodiment substantially as herein described, illustrated and/or exemplified with reference to any one of the accompanying diagrammatic drawings.

BRIEF DESCRIPTION OF THE DRAWINGS

Embodiments of the invention will be described below by way of example only and with reference to the accompanying diagrammatic drawings in which:

FIG. 1b shows a more detailed view of the joint means of FIG. 1 including a smooth inner bore and outer corrugations;

DETAILED DESCRIPTION

The Summary of the disclosure is repeated hereunder by way of reference thereto only to avoid repetition. Like structural elements in the different embodiments are provided with like or corresponding reference numerals in as far as is possible.

Generally, and in accordance with a first embodiment of this disclosure there is provided a nebulizer orientation apparatus 10 for interposition between a nebulizer 302 and an inhalation mask (or mouthpiece) 304 (see FIGS. 1 to 4 and 14). The nebulizer orientation apparatus 10 comprises first and second straight hollow bodies 14, 16 in flow communication with each other via a joint means 12. The joint means 12 facilitates movement of the first and second straight hollow bodies 14,16 relative to each other in a first plane (α) defined by the joint means 12.

Figure 1A:
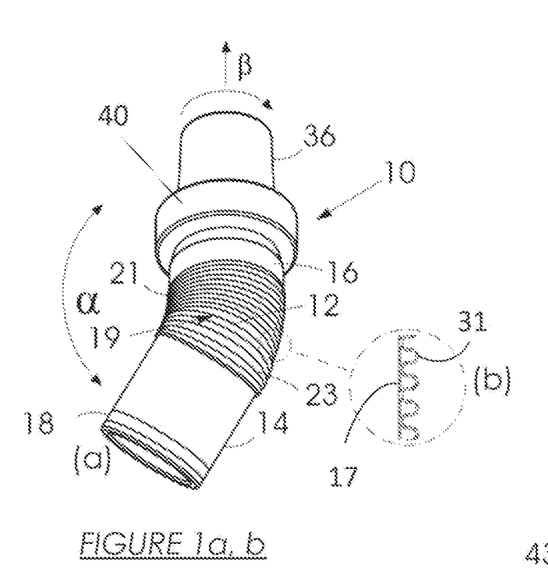
FIG. 1a shows a three dimensional view of a nebulizer orientation apparatus according to a first embodiment of this disclosure, including first and second hollow bodies and a joint means there between, and further including a connector and attachment means for rotational mounting of the connector to the second hollow body.

Typically, the first and second straight hollow bodies 14, 16 each matingly engage the joint means 12. Additionally, or alternatively, the first and second straight hollow bodies 14, 16 and the joint means may be integrally formed.

The first straight hollow body 14 is weighted (using a strap 18) relative to the second straight hollow body 16 to facilitate displacement of the first body 14 under force of gravity relative to the second body 16. This is shown in FIG. 1. Other weight means are envisaged by the Applicant.

Figure 14:
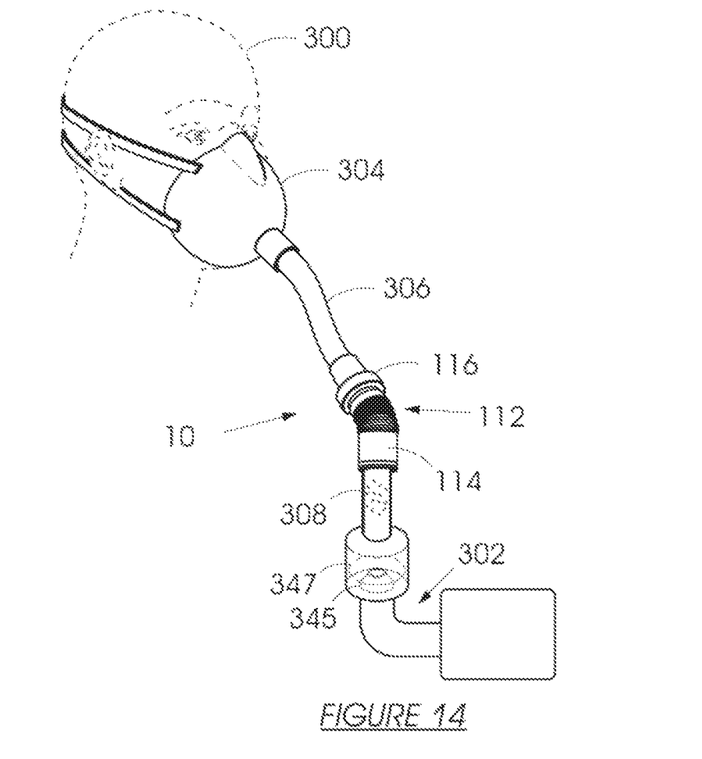
FIG. 14 shows the first embodiment of the disclosure is use by a patient.

In use, the nebulizer 302 is attached to the first body 14 and the inhalation mask (or mouthpiece) 304 is attached to the second body 16, as shown in FIG. 14. The nebulizer 302 (shown diagrammatically) contains a drug entrained solution 347 and the inhalation mask (or mouth piece) 304 placed over a mouth and/or nose of a patient 300, wherein the first body 14 together with the nebulizer may be displaced relative to the second body 16 under force of gravity to ensure that the nebulizer 302, and particularly an aerosol or mist forming means 345 of the nebulizer, is maintained substantially upright relative to ground level therein facilitating effective aerosol and/or mist formation when a torso and/or head of the patient 300 is moved away from a substantially vertical position relative to the ground level.

Figure 3:
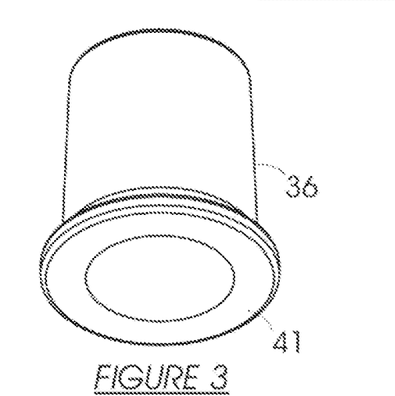
FIG. 3 shows the connector of FIG. 1 having a first near flat collar for rotational mounting to the second near flat collar of the second hollow body shown in FIG. 2.

The nebulizer orientation apparatus 10 further comprises a hollow connector 36 rotationally mounted relative to an outlet portion 38 of the second hollow body 16. The hollow connector is shown in FIG. 3. The rotational movement of the hollow connector 36 relative to the second hollow body 16 is in a second plane (β). The second plane (β) is substantially orthogonal to the first plane (α). As such, this first embodiment of this disclosure provides for at least two degrees of freedom (the first via the joint means 12, and the second between the hollow connector 36 and the second hollow body 16) which is beneficial and enhances patient compliance. In use, the nebulizer may be displaced to remain substantially upright relative to the ground via movement in the plane (α) and the plane (β).

The joint means 12 is typically provided as a deformable conduit. The deformable conduit may comprise a metallic support embedded in a plastics material. The metallic support may be any one of a coil, helix, and/or lattice. The deformable conduit may be resilient. Typically, medical grade plastics material is used, and optionally further embedding a metallic support.

In a certain embodiment of this disclosure, the deformable conduit includes a mid-portion 19 and opposing end portions 21, 23. The mid-portion 19 may have a larger diameter relative to the opposing end portions 21, 23 (not shown). The mid-portion 19 of the joint means 12 is typically provided with corrugations 31 on an outer surface thereof to facilitate selective expansion and/or contraction along the length of the mid-portion 19. An inner bore 17 of the joint means 12 is smooth. The smooth inner bore 17 improves flow of drug entrained aerosol when in use.

The hollow connector 36 is rotationally mounted relative to the outlet portion 38 of the second hollow body 16 via an attachment means 40, wherein the attachment means 40 facilitates rotational movement of the hollow connector 36 relative to the second hollow body 16 in a second plane (β) substantially orthogonal to the first plane (α).

The Applicant envisages other forms of rotational mounting. For example, the hollow connector 36 may matingly engage the second hollow body 16 whilst concomitantly providing for rotational motion relative to each other in the plane shown in the figures as (β).

Figure 2:
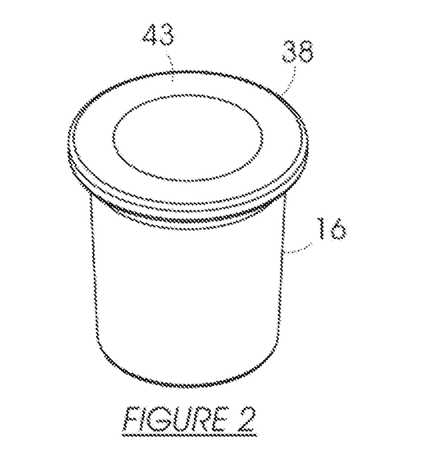
FIG. 2 shows the second hollow body of FIG. 1 defining an outlet portion and a second near flat collar.
Figure 4:
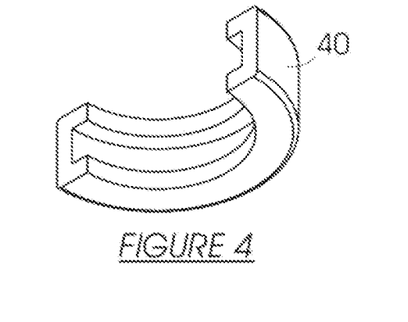
FIG. 4 shows a portion through the attachment means, which is provided as a sleeve, of FIG. 1 for rotatably joining the second hollow body to the connector in the first embodiment of this disclosure.
Figure 5:
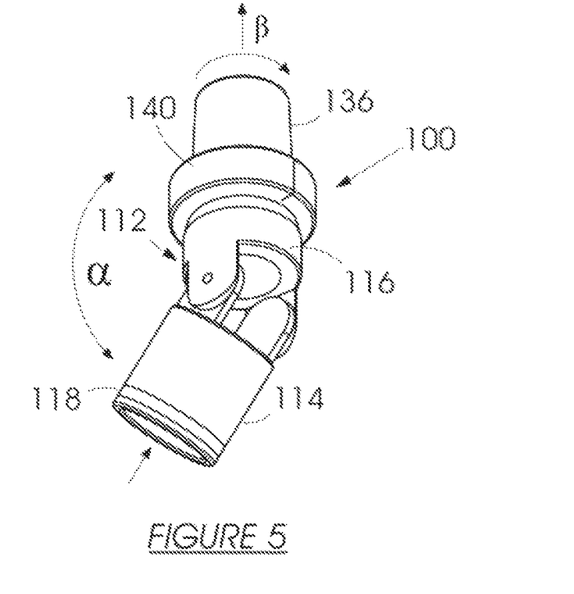
FIG. 5 shows a three dimensional view of the nebulizer orientation apparatus according to a second embodiment of this disclosure including a hinged joint having extending therefrom first and second hollow bodies.
Figure 6:
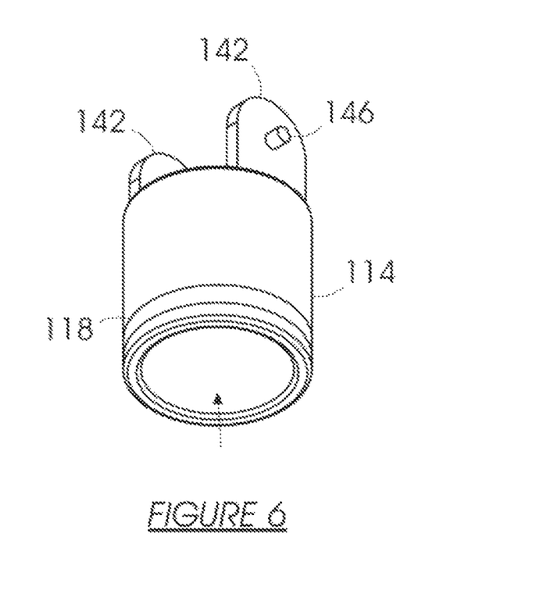
FIG. 6 shows the first hollow body of FIG. 5 having a first pair of lugs to form the hinged joint.
Figure 7:
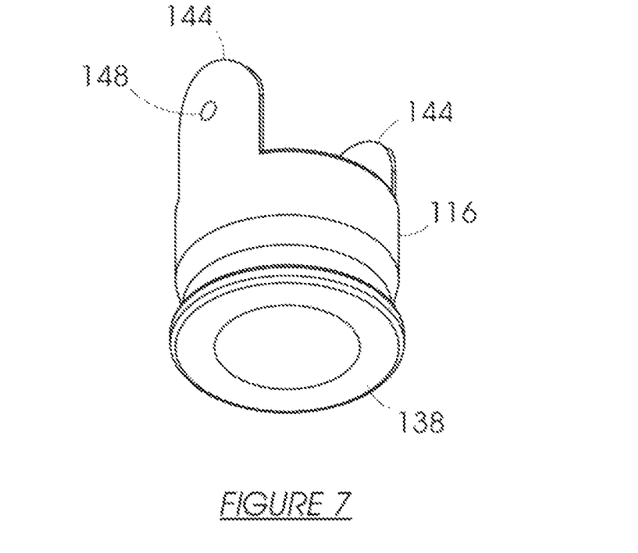
FIG. 7 shows the second hollow body of FIG. 5 having a second corresponding pair of lugs to form the hinged joint.
Figure 8:
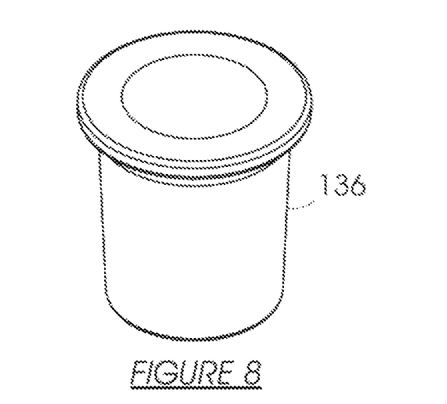
FIG. 8 shows a hollow connector of the nebulizer orientation apparatus of FIG. 5.
Figure 9:
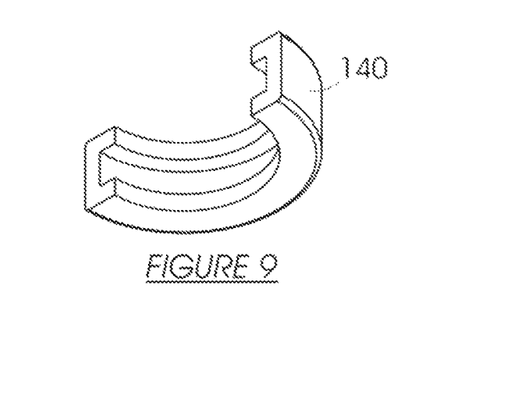
FIG. 9 shows portion through the attachment means (which is provided as a sleeve) for rotatably joining the second hollow body to the connector in the second embodiment of this disclosure.

The hollow connector 36 defines a first near flat collar 41 which abuts a corresponding or similar second near flat collar 43 defined by the outlet portion 38 of the second hollow body 16. This is shown in FIGS. 2 and 3. It is envisaged that the two near flat collars 41, 43 may include mating means to allow for fitting engagement with each other, for example, but not limited to a protruding circular ridge to engage a corresponding circular trough (not shown). The attachments means in FIGS. 1 and 4 is provided for as a sleeve 40 securing the outlet portion 38 of the second hollow body 16 to the hollow connector 36 whilst concomitantly providing rotational motion relative to each other. The rotational motion is shown in the figures as plane (β). A half cut through portion of the sleeve 40 is shown in FIG. 4. Similar attachment means 40 to clamp together the second hollow body 16 and the connector 36 whilst providing rotational motion in plane (β) are envisaged.

Generally, and in accordance with a second embodiment of this disclosure there is provided a nebulizer orientation apparatus 100 for interposition between a nebulizer and an inhalation mask (or mouthpiece). The second embodiment is shown in FIGS. 5 to 9 and in use in FIG. 15. The nebulizer orientation apparatus 100 comprises first and second straight hollow bodies 114, 116 in flow communication with each other via a hinged joint 112. The first straight hollow body 114 is weighted relative to the second straight hollow body 116.

Figure 12:
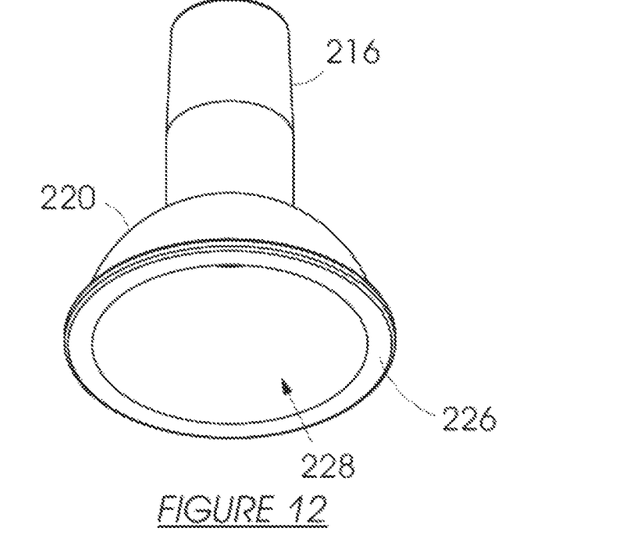
FIG. 12 shows the second straight hollow body and a female frusto-spherical member of the swivel joint including a first flange of the securing means, as shown in FIG. 10.
Figure 13:
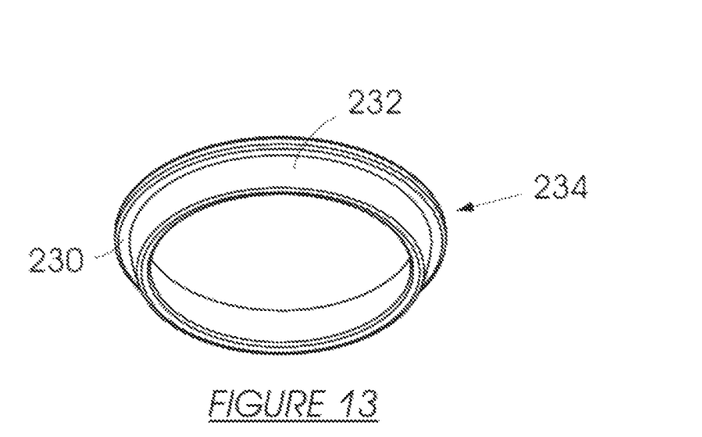
FIG. 13 shows a second corresponding flange of the securing means including a frusto-spherical side wall to ensure mating engagement of the male and female members of the swivel joint.

The additional weight of the first straight hollow body 114 relative to the second 116 is provided by a weight means shown in FIG. 6 as a strap 118. The strap 118 facilitates displacement of the first body under force of gravity relative to the second body.

The apparatus 100 further comprises a hollow connector 136 rotationally secured against an outlet portion 138 of the second hollow body 116 and in flow communication with the inhalation mask (or mouthpiece). The flow is illustrated by headed arrows. The hollow connector 136 allows rotational movement via an attachment means 140 relative to all of the second hollow body 116, the hinge 112 and first hollow body 114.

When in use, the strap 118 of the first hollow body 114 facilitates displacement of the first hollow body 114 under force of gravity relative to the second hollow body 116, said displacement being in a first plane (α) defined by the hinged joint 112.

The attachment means 140 facilitates rotational movement of the hollow connector 136 relative to all of the second hollow body 116, the hinge 112 and the first hollow body 114, in a second plane (β). The second plane (β) is substantially orthogonal to the first plane (α).

The attachment means 140 may be a sleeve securing the outlet 138 of the second hollow body 116 to the hollow connector 136 whilst concomitantly providing rotational motion (β) relative to each other. FIG. 9 shows half of the attachment means being in the form of a sleeve.

The hinged joint 112 may include may include a first pair of lugs 142 attached to the first hollow body 114, and a second corresponding pair of lugs 144 attached to the second hollow body 116, wherein the first and second pair of lugs 142, 144 are secured via interlocking stud 146 and aperture 148 means, respectively. It is to be understood that the lugs 142, 144 may be hingingly secured via alternative means, such as for example, nuts and bolts (not shown).

The hinged joint 112 may further include thereabout, and spanning the first and second hollow bodies 114, 116, a closure (not shown) in order to provide a closed flow path from the first hollow body 114, through the hinged joint 112, through the second hollow body 116, into and through the hollow connector 136 and into the inhalation means (or mouthpiece) to be inhaled by the patient.

The closure may be a resiliently deformable closure to allow hinged movement of the first and second hollow bodies 114, 116 relative to each other through a section of the first plane (α). The closure may be an airtight balloon means surrounding the joint means 112 providing a closed flow path.

Generally, and in accordance with a third embodiment of this disclosure there is provided a nebulizer orientation apparatus 200 illustrated in FIGS. 10 to 13 and FIG. 16. The third embodiment of the nebulizer orientation apparatus 200 is shown in use on a patient in FIG. 15.

In accordance with a third embodiment of this disclosure there is provided a nebulizer orientation apparatus 200. The apparatus 200 is for interposition between a nebulizer and an inhalation mask for mouthpiece) (as shown in FIG. 16) when providing a drug to a patient via inhalation.

The apparatus 200 comprises a swivel joint 212 having extending from opposite ends thereof first and second straight hollow bodies 214, 216, respectively. The first straight hollow body 214 is weighted relative to the second straight hollow body 216 by attaching to the first hollow body a weight means in the forms of a strap 218.

In use, the weight of the first hollow body 214 facilitates displacement thereof under force of gravity relative to the second hollow body 216.

The swivel joint 212 is shown to comprise a ball and socket arrangement, wherein the socket defines therethrough an aperture and is provided as a female frusto-spherical member 220, and wherein the ball may be provided as a complementarily shaped and dimensioned male frusto-spherical member 222 defining therein a cavity 223 such that the male and female members matingly engage to provide a flow path (indicated by headed arrows) from the first hollow body 214 through the swivel joint 212 and out through the second hollow body 216. In FIG. 11, the cavity 223 is spanned by two arches 225, 227 crossing at a midway point. It is to be understood that the arches 225, 227 are illustrative only, and do not form an essential component of the apparatus 200.

In the illustrated example embodiments of FIGS. 10 to 13, the female frusto-spherical member 220 of the swivel joint 212 is attached to the second hollow body 216, and the complementarily shaped and dimensioned male frusto-spherical member 222 of the swivel joint 212 is attached to the first hollow body 214. It is to be understood that the female frusto-spherical member 220 of the swivel joint 212 may alternatively be attached to the first hollow body 214, and the complementarily shaped and dimensioned male frusto-spherical member 222 of the swivel joint 212 may be attached to the second hollow body 216 without departing from the scope of this disclosure.

In FIGS. 10 to 13, the first hollow body 214 is weighted by providing there around a strap 218. It is to be understood that the additional weight of the first hollow member 214 may be provided by manufacturing the first hollow member 214 from a heavier material relative to the second hollow body 216. This is not illustrated.

Alternatively, the first and second hollow bodies 214, 216 may be manufactured from substantially the same material, and the first hollow body 214 may weighted by being greater in length relative to the second hollow body 216, so as to provide the first hollow body 214 with a greater mass relative to the second hollow body 216. This is not illustrated.

It is further to be understood that the weight means may be integrally formed with the first hollow body 214. In a particular example of the first embodiment of this disclosure the weight means may be a thickening of a portion of a sidewall providing the first hollow body 214 (not shown).

The swivel joint 212 is shown to include a securing means 224 to ensure that the male frusto-spherical member 222 remains matingly engaged inside the female frusto-spherical member 220 whilst still facilitating swiveled displacement and/or pivotal displacement relative to each other.

The securing means 224 comprises a first flange 226 extending radially outwardly away from a periphery which defines an open mouth 228 of the female frusto-spherical member 220. The securing means 224 further comprises a second corresponding flange 230 for securement to the first flange 226, the second corresponding flange 230 having depending downwardly away therefrom a frusto-spherical side wall 232. The second flange 230 and sidewall 232 are together provided as a ring 234. The first and second flanges 226, 230 have oppositely located flat near circular faces to allow for operative abutment in use.

The ring 234 is locatable over the first body 214 when the male member 222 is matingly engaged with the female member 220 to secure the second flange 230 against the first flange 226 such that the frusto-spherical sidewall 232 prevents disengagement of the frusto-spherical male member 222 from the female frusto-spherical member 220.

The first and second flange 226, 230, may be joined in securing abutment through various means, for example, glue. In a certain embodiment, the first and second flanges 226, 230 may be spaced by a rubber ring.

Figure 10:
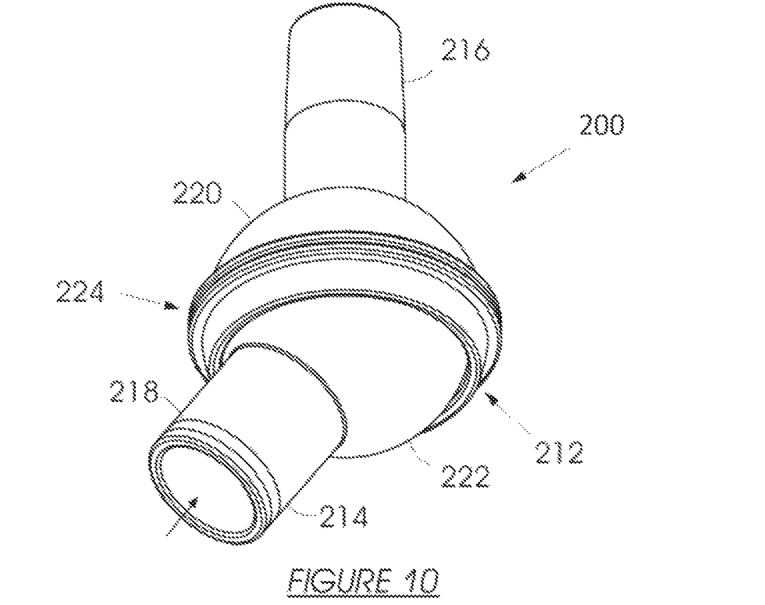
FIG. 10 shows a three dimensional view of a nebulizer orientation apparatus according to a third embodiment of this disclosure including a swivel joint having extending from opposite ends thereof first and second straight hollow bodies.
Figure 11:
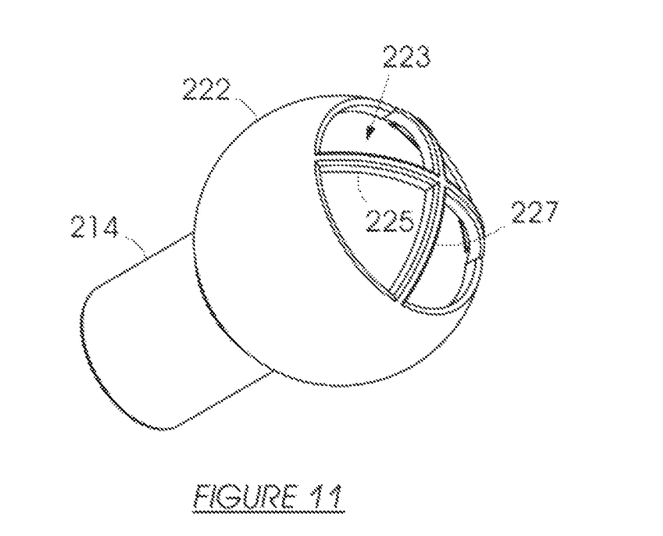
FIG. 11 shows the first straight hollow body and a male frusto-spherical member of swivel joint shown in FIG. 10.

It is to be understood that the swivel joint 212 may provide a seal in order to ensure all aerosol or mist travels through the flow path toward the inhalation mask (or mouthpiece) without escaping through the swivel joint 212. In certain embodiments the swivel joint 212 does not to provide a seal in order to substantially equalize pressure relative to atmospheric pressure.

Figures 15, 16:
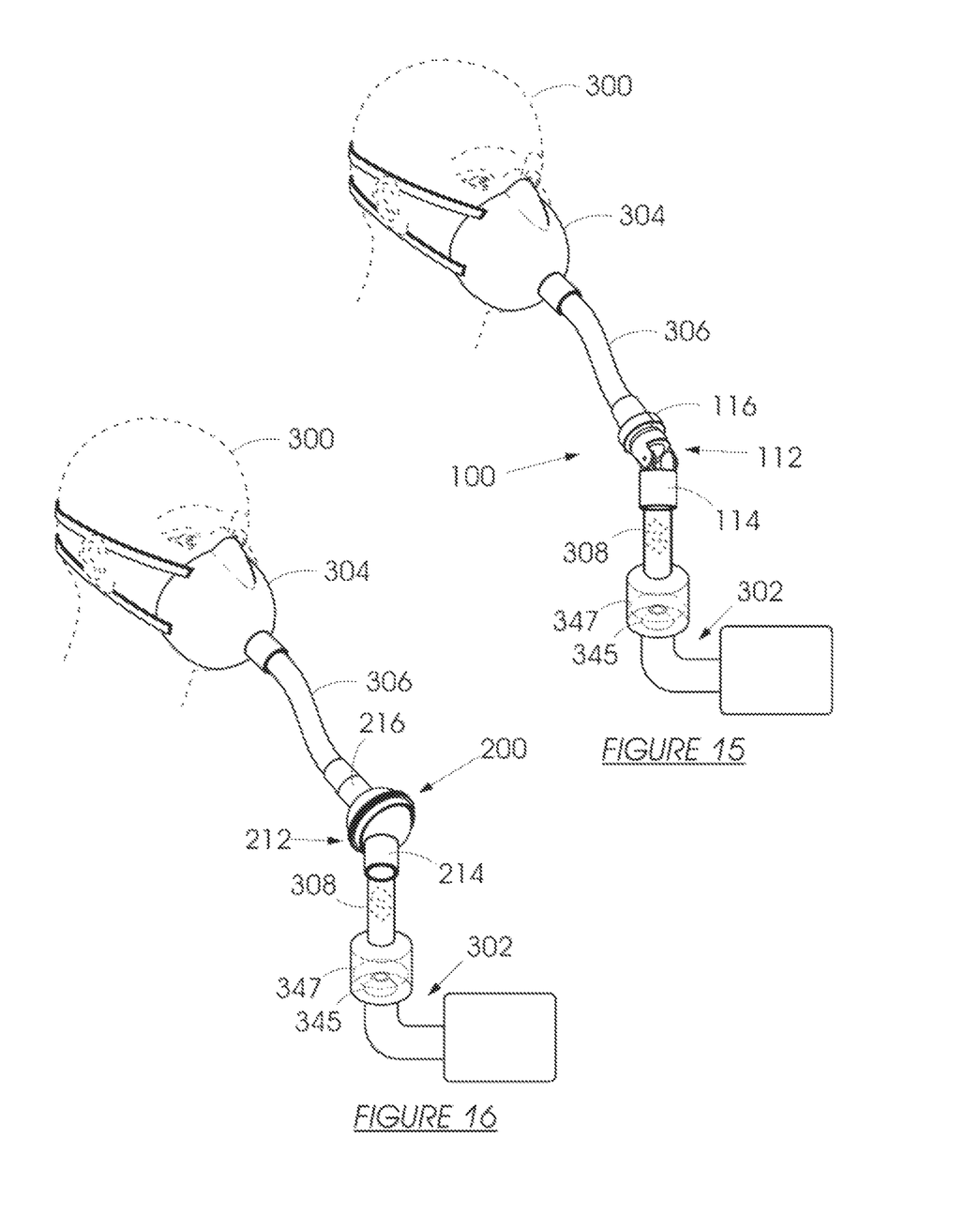
FIG. 15 shows the second embodiment of the disclosure in use by a patient.
FIG. 16 shows the third embodiment of the disclosure in use by a patient.

The third embodiment of the nebulizer orientation apparatus 200 is shown in use on a patient 300 in FIG. 16.

In FIGS. 14-16 the nebulizer orientation apparatus 10, 100, 200 is located between a nebulizer 302 and an inhalation mask (or mouthpiece) 304. The inhalation mask (or mouthpiece) 304 is attached to the apparatus 10, 100, 200 via a substantially flexible tube 306 typically manufactured from a medical grade plastics material. The nebulizer 302 is attached to the apparatus 10, 100, 200 via a connector means 308. The connector means 308 means may be flexible. The flexible tube 306 and/or the connector means 308 may each or both be provided as plastics tubing being reinforced with a metallic coil, or a series of metallic rings. The coil and/or rings may be embedded within a plastics material forming the tubing. Additionally, or alternatively, the flexible tube and/or connector means 308 may each or both be provided as expandable tubing. Typically, expandable tubing is provided with corrugations along its length.

The first and second straight hollow bodies facilitate ensuring that drug entrained aerosol or mist remains in an aerosolized and/or atomized form when in use.

In accordance with a fourth embodiment of this disclosure there is provided a method of nebulizing a patient utilizing the nebulizer orientation apparatus 10, 100, 200, described in the first, second and/or third embodiments of the disclosure herein above. The method is not specifically illustrated but is exemplified and/or described here below.

The method comprises the following steps:
connecting a nebulizer 302 containing drug entrained solution 347 therein to the first hollow body 14, 114, 214;
connecting the inhalation mask (or mouthpiece) 304 to the second hollow body 16, 116, 216, preferably via a first tube 306;
placing the inhalation mask (or mouthpiece) 304 about an oral and/or nasal cavity of the patient 300;
actuating the nebulizer 302, in so doing,
allowing the drug entrained solution 347 to aerosolize and/or atomize into a drug entrained aerosol or mist through an aerosol or mist forming means 345.

The drug entrained aerosol or mist travels through the flow path (indicated by headed arrows in the figures) flowing through the joint means 12, 112, 212 into and through the second hollow body 16, 116, 216, through the inhalation means (or mouthpiece) 304 and into the oral and/or nasal cavity of the patient 300.

The aerosol or mist forming means 345 is typically a nozzle found in standard nebulizers. Preferably, the nozzle may taper from a first orifice which in use receives drug entrained solution and gas to an opposite spray orifice from which the aerosol or mist is dispensed (this is not shown in detail in the figures).

The Applicant has found that the first and second straight hollow bodies 14, 16 (114, 116) (214, 216) provide a flow path through the apparatus 10, 100, 200 that is substantially unobstructed hindering condensation of aerosol or mist, and that the weighted first straight hollow member 14, 114, 214 enables the aerosol or mist forming means (typically the nozzle) of the nebulizer 302 to remain substantially vertical relative to the ground, and in so doing, ensuring proper nebulization or aerosol or mist formation from the drug entrained solution 347.

While the disclosure has been described in detail with respect to specific embodiments and/or examples thereof, it will be appreciated that those skilled in the art, upon attaining an understanding of the foregoing may readily conceive of alterations to, variations of and equivalents to these embodiments. Accordingly, the scope of the present disclosure should be assessed as that of the claims and any equivalents thereto, which claims are appended hereto.

The invention claimed is:

1. A nebulizer orientation apparatus for interposition between a nebulizer and an inhalation mask or mouthpiece, the nebulizer orientation apparatus comprising first and second straight hollow bodies and joint means for conducting fluid between the first and second straight hollow bodies along a smooth flow path and for facilitating movement of the first and second straight hollow bodies relative to each other in a first plane defined by the joint means, wherein the first straight hollow body is weighted relative to the second straight hollow body to facilitate displacement of the first body under force of gravity relative to the second body, wherein the first and second straight hollow bodies are integrally formed with the joint means without a need to mate them together, and wherein the joint means is a deformable conduit comprising a smooth inner bore and is expandable and/or contractable along its length.

2. The nebulizer orientation apparatus of claim 1, wherein the deformable conduit comprises a metallic support embedded in a plastics material;
wherein the metallic support is any one selected from the group: coil, helix and lattice;
wherein the deformable conduit is resilient;
wherein the deformable conduit is provided with corrugations on an outer surface to facilitate expansion and/or contraction along its length; and
wherein the deformable conduit includes a mid-portion having a larger diameter relative to opposing end portions.

3. The nebulizer orientation apparatus of claim 1, further comprising a hollow connector rotationally mounted relative to an outlet portion of the second hollow body, wherein rotational movement of the hollow connector relative to the second hollow body is in a second plane substantially orthogonal to the first plane.

4. The nebulizer orientation apparatus of claim 1, further comprising a hollow connector rotationally mounted relative to an outlet portion of the second hollow body, wherein rotational movement of the hollow connector relative to the second hollow body is in a second plane substantially orthogonal to the first plane, wherein the hollow connector is rotationally mounted relative to the outlet portion of the second hollow body via an attachment means, wherein the attachment means facilitates rotational movement of the hollow connector relative to the second hollow body in the second plane, and wherein the attachment means is provided as a sleeve securing the outlet portion of the second hollow body to the hollow connector whilst concomitantly providing rotational motion relative to each other.

5. The nebulizer orientation apparatus of claim 1, further comprising a hollow connector rotationally mounted relative to an outlet portion of the second hollow body, wherein rotational movement of the hollow connector relative to the second hollow body is in a second plane substantially orthogonal to the first plane, wherein the hollow connector is matingly engaged the outlet of the second hollow body whilst being adapted to concomitantly provide for rotational motion of the second hollow body relative to the hollow connector.

6. The nebulizer orientation apparatus of claim 1, wherein the first hollow body is weighted by being formed from a heavier material relative to the second hollow body, therein facilitating displacement of the first hollow body under force of gravity relative to the second hollow body.

7. The nebulizer orientation apparatus of claim 1, wherein, the first and second hollow bodies are manufactured from the same material, and the first hollow body is weighted by being greater in length relative to the second hollow body, so as to provide the first hollow body with a greater mass relative to the second hollow body, therein facilitating displacement of the first hollow body under force of gravity relative to the second hollow body.

8. The nebulizer orientation apparatus of claim 1, wherein, the first hollow body is weighted by having attached thereto a weight means.

9. The nebulizer orientation apparatus of claim 8, wherein the weight means is a collar and/or a ring at least partially surrounding the first hollow body, and wherein the weight means is integrally formed with the first hollow body.

10. The nebulizer orientation apparatus of claim 9, wherein the weight means is a thickening of a portion of a sidewall providing the first hollow body.

11. A method of nebulizing a patient utilizing the nebulizer orientation apparatus of claim 1, the method comprising the following steps:
connecting a nebulizer containing drug entrained solution therein to the first hollow body, wherein the first hollow body is a first tube;
connecting the inhalation mask or mouthpiece to the second hollow body, wherein the second hollow body is a second tube;
placing the inhalation mask or mouthpiece about an oral and/or nasal cavity of the patient;
actuating the nebulizer, in so doing,
allowing the drug entrained solution to aerosolize and/or atomize into a drug entrained aerosol or mist through an aerosol or mist forming means, the drug entrained aerosol or mist flowing through the first follow body into the joint means, then into and through the second hollow body, through the inhalation means or mouthpiece and into the oral and/or nasal cavity of the patient.

12. The method according to claim 11, wherein, the drug entrained aerosol or mist flowing into the oral and/or nasal cavity of the patient, a torse and/or head of the patient is disposed away from a substantially vertical position relative to ground level and a weight of the first straight hollow body relative to the second straight hollow body causes the aerosol or mist forming means of the nebulizer to remain substantially vertical relative to the ground level.

13. The nebulizer orientation apparatus according to claim 1, wherein, with a nebulizer connected to the first hollow body of the nebulizer orientation apparatus via a first tube and the inhalation mask or mouthpiece disposed about an oral and/nasal cavity of a patient and connected to the second hollow body via a second tube, and with a torso and/or head of the patient disposed away from a substantially vertical position relative to ground level, an aerosol or mist forming means of the nebulizer remains substantially vertical relative to the ground by virtue of the relative weighting of the first straight hollow body relative to the second straight hollow body.

14. A nebulizer orientation apparatus for interposition between a nebulizer and an inhalation mask or mouthpiece, the nebulizer orientation apparatus comprising first and second straight hollow bodies and joint means for conducting fluid between the first and second straight hollow bodies along a smooth flow path and for facilitating movement of the first and second straight hollow bodies relative to each other in a first plane defined by the joint means, wherein the first straight hollow body is weighted relative to the second straight hollow body to facilitate displacement of the first body under force of gravity relative to the second body, wherein the first and second straight hollow bodies and the joint means form a unitary construct without a need to mate them together, and wherein the joint means is a deformable conduit comprising a smooth inner bore and is expandable and/or contractable along its length.

* * * * *